April 28, 1936.  M. VOS ET AL  2,039,202

ELECTRICAL NETWORK

Filed March 24, 1933  8 Sheets-Sheet 1

M. Vos
F. R. V. Stålemark
INVENTORS

By: Marks & Clerk
Attys.

M. Vos
F. R. V. Stålemark
INVENTORS

By: Marks & Clerk
Attys.

April 28, 1936.   M. VOS ET AL   2,039,202
ELECTRICAL NETWORK
Filed March 24, 1933    8 Sheets-Sheet 7

M. Vos
F. R. V. Stållemark
INVENTORS

By Marks & Clerk
Attys.

Patented Apr. 28, 1936

2,039,202

UNITED STATES PATENT OFFICE 2,039,202

ELECTRICAL NETWORK

Mauritz Vos and Fritz Ragnar Valdemar Stålemark, Stockholm, Sweden, assignors to Telefonaktiebolaget L. M. Ericsson, Stockholm, Sweden, a company of Sweden Application March 24, 1933, Serial No. 662,600
In Sweden April 1, 1932

18 Claims. (Cl. 178—44)

The present invention relates to an electrical impedance network intended to be inserted in or connected to telephone lines or other signal transmitting lines.

The invention will be described with reference to the accompanying drawings.

Figure 1:
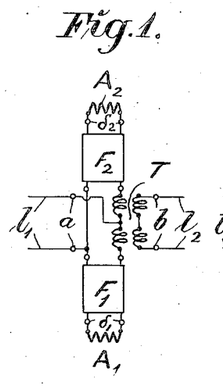
Figure 1 shows in principle an impedance network according to the invention comprising a differential transformer and two filters.

The network shown in Figure 1 is composed of a differential transformer T and two filters $F_1$, $F_2$ dimensioned to let through the same frequency range. The differential transformer and the filters are connected together so as to form a bridge in which the differential transformer is included in two adjacent arms, the filters forming the remaining arms. The input and output terminals $a$ and $b$ respectively of the network are taken out across the two diagonals of the bridge. The pair of terminals with which the filters $F_1$, $F_2$ are connected to the bridge are termed the inner pair of terminals of the filters as distinguished from the outer pair of terminals which are turned away from the bridge. According to the invention the two filters should be so dimensioned that the geometrical mean of their characteristic impedances measured at the inner pairs of terminals of the filters is substantially constant for all frequencies. If $X_1$ and $X_2$ designate the said impedances of the filters $F_1$ and $F_2$ at their inner terminals the product $X_1.X_2$ should be independent of the frequency. If $\mu$ is the ratio of transformation of the transformer T, reckoned in the direction from secondary to primary, the short-circuit impedances $Z_{bs}$ and the open circuit impedance $Z_{bo}$ at the terminals $b$ of the network are:

$$Z_{bs} = 4\mu^2 \frac{X_1 X_2}{X_1 + X_2}$$

$$Z_{bo} = \mu^2 (X_1 + X_2)$$

provided T operates approximately as a perfect transformer. The corresponding quantities at the terminals $a$ are:

$$Z_{as} = \frac{X_1 X_2}{X_1 + X_2}$$

$$Z_{ao} = \frac{1}{4}(X_1 + X_2)$$

From these formulas it follows that the characteristic impedances of the network at the terminals $a$ and $b$ respectively are $$Z_a = \sqrt{Z_{as} \cdot Z_{ao}} = \frac{1}{2}\sqrt{X_1 X_2}$$

$$Z_b = \sqrt{Z_{bs} \cdot Z_{bo}} = 2\mu^2 \sqrt{X_1 . X_2}$$

These characteristic impedances are, accordingly constant for all frequencies. In Figure 1 the network is assumed to be connected between two sections $l_1$, $l_2$ of a line connection. The end resistances $A_1$, $A_2$ connected between the outer terminals $\delta_1$, $\delta_2$ of the filters $F_1$, $F_2$ may, for instance, consist of senders and receivers for the same frequency band. A signal within the frequency band of the filters coming in from the line section $l_1$ is divided equally on the two filters $F_1$, $F_2$ and can be received in the receiver $A_2$. The currents in the windings of the differential transformer connected to one of the input terminals then have opposite effects on the secondary winding connected between the output terminals of the network so that the resulting current in said winding becomes zero. If, on the other hand, a signal comes in from the line section $l_1$ the frequencies lying outside the band range of the filters one of said filters will form, at its corresponding pair of terminals, a very high resistance for said frequencies as the filters do not let through said frequencies and as the geometrical mean of the characteristic impedance shall be constant for all frequencies. The difference between the currents in the two halves of the primary winding of the differential transformer thus becomes comparatively great and the signal is transmitted to the output terminals $b$ of the network. For example, if for said frequency range falling outside the frequency bands of the filters the characteristic impedances at the inner pairs of terminals is zero or infinity respectively, only the lower half of the primary winding of the differential transformer will be effective. In case signals are sent from $A_1$ the energy is distributed equally to the two line sections $l_1$ and $l_2$. If the normal direction of sending is from line $l_1$ to line $l_2$ it is conceivable to have devices, for instance amplifiers, connected in the line $l_1$ which devices are effective only in the direction $l_1$, $l_2$. Signals sent from $A_1$ and transmitted to line $l_1$ can therefore not become effective.

Figure 2:
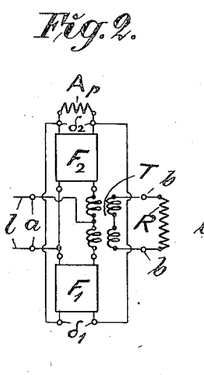
Figure 2 shows an embodiment in which the outer terminals of the filters are connected in parallel.
Figure 3:
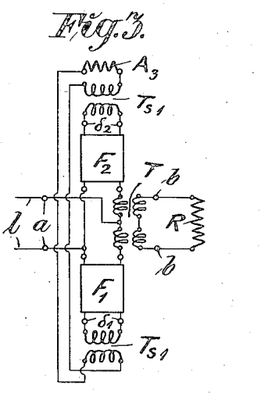
Figure 3 shows a similar circuit arrangement in which the outer terminals of the filters are connected in series through transformers.

In order to be able to receive all energy coming in at the input terminals $a$ of a signal receiver or to cause energy sent from a sender to be transmitted in one direction only, the outer pair of terminals of the filter may be connected in parallel or in series according to Figures 2 or 3 respectively. The connection in series is in this case effected by means of two transformers $T_{s1}$ and $T_{s2}$. Oscillation energy comprising frequencies within the band range of the filter and coming in from a line $l$ connected to the terminals as is equally distributed to the two filters and cooperates in the receiver $A_p$ and $A_s$ respectively. On the other hand, all energy outside the band range of the filters, which comes in from the line $l$, passes through the differential transformer $T$ to the resistance $R$ which may be assumed to consist of a receiver for said frequency. Corresponding conditions prevail for sending from $A_p$, $A_s$ and $R$ respectively. Signals sent from $A_p$ or $A_s$ pass through both filters and are combined in the differential transformer in such phase that the sum of the currents in the two halves of the primary winding of the differential transformer becomes zero, and as a consequence no part of the energy is transmitted to the secondary winding and the output terminals $b$ but the total energy passes out on the line $l$. Signals outside the band range of the filters which are sent from $R$ pass, similarly as in the arrangement according to Figure 1, directly out on the line $l$. The arrangements shown in Figures 2 and 3 may thus be used for receiving signals within two different ranges of frequencies or for sending signals within one range of frequency and receiving signals within another range of frequency.

Figure 4:
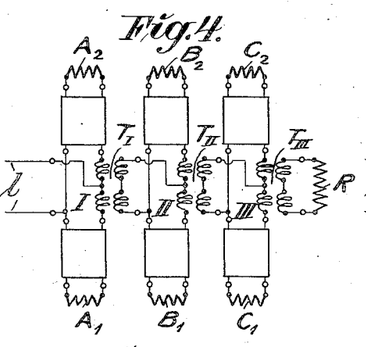
Figure 4 shows three impedance networks according to Figure 1 connected in cascade.

In Figure 4 are shown three different impedance networks I, II, III according to Figure 1 connected in cascade, each of said impedance networks being dimensioned for a different range of frequency. As for each impedance network the characteristic impedance at the input as well as at the output terminals is constant for all frequencies, such a connection in cascade of different networks may be made without risking reflections at the junction points. To the networks I, II, III senders $A_1$, $B_1$, $C_1$ and receivers $A_2$, $B_2$, $C_2$ are connected at the outer terminals of the filters. The network I is with its input terminals connected to a line $l$ and the network III is connected with its output terminals to an end resistance R. Signals coming in from the line $l$ are distributed according to frequency to each of the three networks and actuate receivers $A_2$, $B_2$, $C_2$. Frequencies not belonging to any of the ranges of frequencies of the networks pass directly through all three differential transformers to the resistance R. Of the energy sent from $A_1$, $B_1$, $C_1$ one half will pass out on the line $l$ and the other half will be dissipated in the end resistance R.

Figure 5:
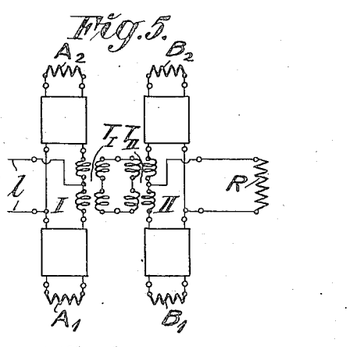
Figure 5 shows a similar cascade connection of two impedance networks according to Figure 1 comprising two interconnected differential transformers.
Figure 6:
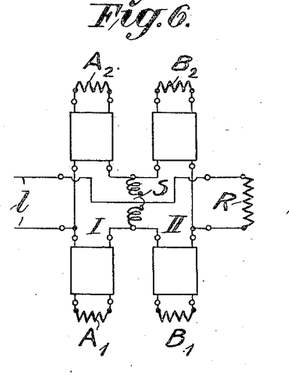
Figure 6 shows the same circuit arrangement as Figure 5 except that the differential transformers are combined to form a differential choke coil.
Figure 7:
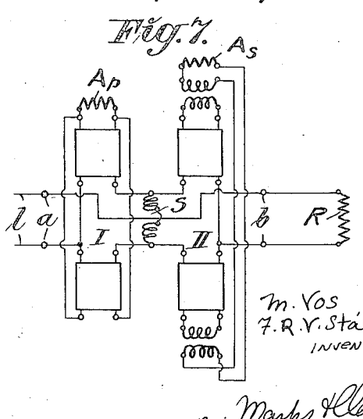
Figure 7 shows a similar interconnection by means of a differential choke coil of two impedance networks according to Figures 2 and 3.

In Figure 5 is shown a cascade connection of two networks according to Figure 1, in which the differential transformers $T_I$, $T_{II}$ in each network face each other. The output terminals of the network I are thus connected with the output terminals of the network II. As has already been mentioned in connection with Figure 1 the ratio of transmission of the differential transformer of such a network shall be 2:1 reckoned towards the output terminal in order to obtain the same characteristic impedance at the input and the output terminals. If the two differential transformers $T_I$, $T_{II}$ are dimensioned accordingly a stepping down is first effected in $T_I$ and thereafter a corresponding stepping up in $T_{II}$ reckoned in the direction from the network I to the network II. The two transformers taken together as a whole thus act as a choke coil and may in accordance with Figure 6 also be substituted by such a coil S, the arrangement then becoming very simple. Such a circuit arrangement may find application in connection with high frequency telephony on ordinary telephone lines and particularly in connection with a so-called single channel system in which an extra audio channel is produced by introducing above the usual voice frequency range a special high frequency channel consisting of a frequency band for each talking direction. One network will then serve for receiving and the other for sending. If $A_1$ is a sender and $B_1$ is a receiver, $A_2$ and $B_2$ consist of ordinary end resistances. However, half of the energy will then be lost in sending as well as in receiving. In order to avoid this an arrangement according to Figure 7 may be used. This arrangement is in analogy with Figure 6 composed of two networks according to Figures 2 and 3. In this arrangement the whole energy sent from, for instance, $A_p$ will pass out on the line $l$ and the whole of the energy coming in from the line $l$ within the frequency range of the network II is received in the receiver $A_s$.

Figure 8:
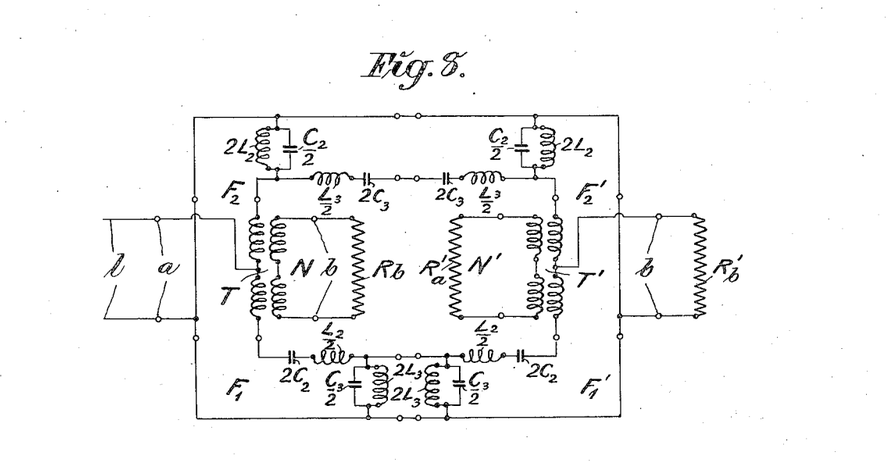
Figure 8 shows two impedance networks according to Figure 1 interconnected in such a manner, that the filters incorporated in the networks are directly connected together at their outer terminals.

According to the invention two networks according to Figure 1 may also be connected together in other manners. In Figure 8 is shown a network combination N, N' in which the outer pair of terminals of the filters in one network are connected in such a manner with the corresponding pair of terminals in the other filter that the filters terminate each other correctly at the junction points. As each of the filters $F_1$, $F_2$, $F_1'$, $F_2'$ in Figure 8 consists of a half section of the same band filter type dimensioned in the same manner, each of the filter groups $F_1$, $F_1'$ and $F_2$, $F_2'$ respectively will upon the interconnection form a filter consisting of a full filter section. In the embodiment shown in Figure 8 the filters consist of band filters of the type in which a half section consists of a shunted parallel resonant circuit and a series resonant circuit connected in series. The shunt resonant circuit is composed of a coil $2L_2$ and a condenser $$\frac{C2}{2}$$

and the series resonant circuit is composed of a coil $$\frac{L3}{2}$$

and a condenser $2C_3$. In the connecting together of the half sections certain elements may be conjoined in known manner which, however, is not shown in the figure. Of frequencies coming in from a line $l$ connected to the input terminals $a$ of the impedance network $N$, those frequencies lying within the frequency range of the band filter will pass with equal energy distribution through the filter chain $F_1$, $F_1'$ and $F_2$, $F_2'$ and are combined in such a manner in the differential transformer $T'$ of the filter $N'$ that the whole energy will pass into an apparatus $R_a'$ connected to the terminals $a'$ of the network $N'$. Frequencies outside the band range of the filters, which come in from the line $l$, pass directly through the differential transformer $T_2$ into an apparatus $R_b$ connected to the secondary winding of said transformer. That this will be the case is evident from the following consideration. For frequencies below the band range of the filters the series condenser $2C_2$ in the filter $F_1$ constitutes a very high resistance whereas the shunt coil $2L_2$ in the filter $F_2$ constitutes a very low resistance whereby only the upper half of the primary winding of the differential transformer $T$ becomes effective and the voltage is transmitted to the secondary winding. For frequencies above the band range of the filters the same condition occurs, as in this case the series coil $$\frac{L2}{2}$$

in the filters $F_1$ constitutes a high impedance and the capacity $$\frac{C2}{2}$$

in the filter $F_2$ constitutes a low impedance. For sending in the opposite direction, i. e. for frequencies within the band range of the filters from $R_a'$ and for frequencies outside the band range of the filters from $R_b$, analogous conditions prevail.

Figure 9:
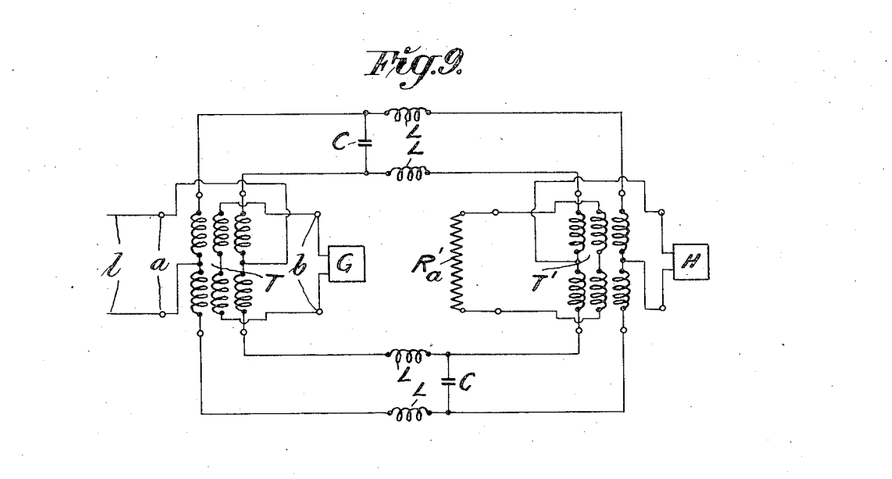
Figure 9 shows a similar arrangement for multiple working with telephony and sub-audio telegraphy on the same line.

In Figure 9 is shown a practical example of such a connection according to Figure 8. The arrangement shows a line connecting device for connecting a telephone set $G$ as well as a telegraph $H$ to one and the same line $l$ for the purpose of composite working with ordinary telephony and sub-audio telegraphy. The common filters in the networks, each containing a shunt condenser $C$ and two series coils $L$, each form a half section of a low pass filter which only lets through frequencies below a certain limiting frequency, for example 80 periods per second. The telegraph $H$ thus operates with frequencies below 80 periods per second on the line $l$ without disturbing the telephone $G$ and the telephone, on the other hand, operates within the ordinary frequency range above 80 periods per second without influencing the telegraph apparatus. If frequencies exceeding 80 periods per second are sent from the latter said frequencies cannot pass the filter but are dissipated in the resistance $R$.

Figure 10:
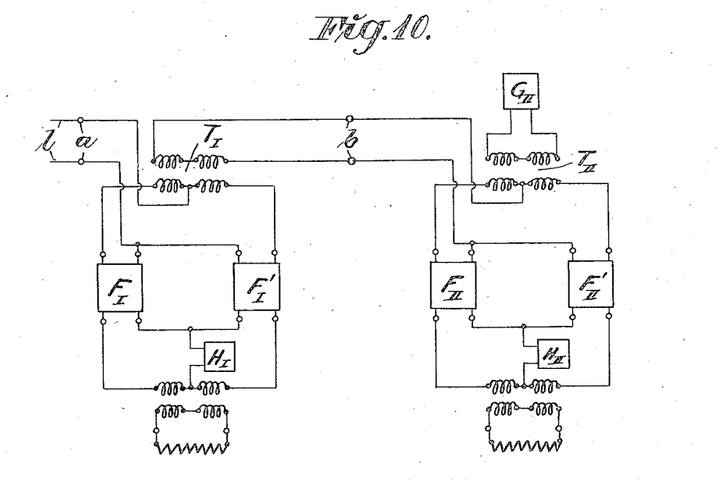
Figure 10 shows an interconnection of two structures according to Figure 9.

In order to render possible multi-band telegraphy and telephony the telephone apparatus $G$ in Figure 9 may be replaced by a further similar network combination, a circuit arrangement according to Figure 10 being then obtained. Said arrangement permits the connecting in of three receiving or sending apparatus $H_I$, $H_{II}$ and $G_{II}$, each of the combinations having the same effect as in Figure 9. The connection between the line $l$ and the apparatus $H_I$ takes place by means of the filter $F_I$, $F'_I$ within the frequency band of said filters and the connection between the line $l$ and the apparatus $H_{II}$ is effected by means of the filters $F_{II}$, $F'_{II}$ within the frequency band of said latter filters. The connection between $l$ and $G_{II}$ is effected within the remaining range of frequencies. The two differential transformers $T_I$ and $T_{II}$ may, in analogy with Figure 5, be connected together in such a manner that they act together as a differential choke coil and can be substituted by such a coil.

Figure 11:
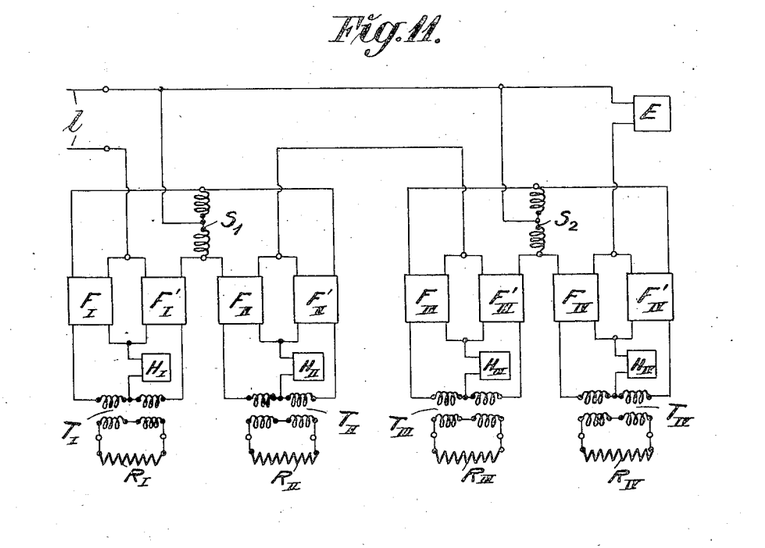
Figure 11 shows an interconnection of two structures according to Figure 10.

In Figure 11 is shown a circuit arrangement composed of two arrangements according to Figure 10, in which the differential transformers have been conjoined to differential choke coils $S_I$ and $S_{II}$ respectively. The choke coil $S_I$ thus corresponds to $T_I$ and $T_{II}$ in Figure 10, and $S_{II}$ corresponds to the same differential transformers in a similar arrangement. In the arrangement according to Figure 11 five such apparatus $H_I$, $H_{II}$, $H_{III}$, $H_{IV}$ and $E$ may operate on one and the same line $l$, each within its frequency range, without disturbing each other.

Figures 12 to 26 refer to an arrangement for amplifying in a two-wire connection, for instance a telephone line, containing two or more audio channels the oscillations in one audio channel independently of the other oscillations. In two-wire lines with multiple working, in which the different audio channels are formed through for instance different frequency ranges or frequency bands, it is often necessary to amplify the different frequency bands independently of each other, or one of the frequency bands independently of the others. This requirement is met with in for example subaudio or high frequency telegraphy over telephone lines or in multiple telephony. Hitherto separating filters have been used for separating the different audio channels namely on the one hand a separating filter inserted in the line and adapted to pass the range of frequencies not to be amplified and on the other a separating filter at each side of the amplifier, which is connected into a branch line, both of said filters being adapted to let through only the frequencies to be amplified. As, however, said three filters must be built up from a comparatively great number of links such a structure becomes comparatively expensive.

According to the present invention the same result may be obtained with less complicated filters through the employment of the above described networks or other similar networks with composite filter effects.

A network of the above described kind has the property that the input characteristic impedance at one pair of main terminals is real for all frequencies within as well as outside the common frequency range of the two filters, provided that the network is terminated at the other pair of main terminals with a suitable ohmic resistance or an apparatus or a line having a corresponding real characteristic impedance. Oscillations within said frequency ranges, which are supplied to the input terminals, may be taken out with half of their energy from each of the two free pairs of output terminals of the filters, whereas on the other hand the voltage is zero for said frequencies at the other pair of main terminals, so that no oscillations inside the common frequency range of the filters can pass out through said pair of terminals. When, on the other hand, oscillations of frequencies outside the common frequency range of the filters are supplied to the pair of main terminals serving as input terminals, said oscillations leave the network exclusively at the other pair of main terminals without giving rise to a voltage at the free pairs of terminals of the filters. In this manner a complete separation of the frequencies inside and outside the frequency range of the filters may be obtained.

The use of the double network according to the invention for amplifier connections is based upon the fact that the groups of frequencies separated in this manner may be brought together again without loss of energy by means of a further network of the same kind. This possibility is made use of in such a manner that one group or both groups of frequencies are amplified independently of each other before they are brought together again. The amplifier may be connected between a pair of terminals of one network serving as output terminals and a pair of main terminals of the other network serving as input terminals.

The use of double networks of the present kind in amplifier connections would be most simply explained with reference to Figure 12.

Figure 12:
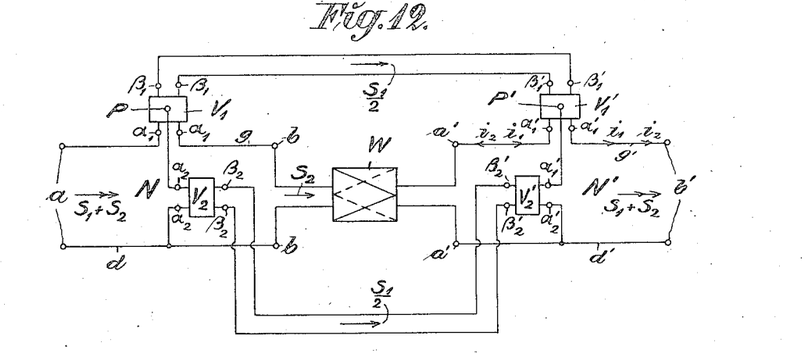
Figures 12 to 26 shows different applications of the impedance network according to the preceding figures or of other impedance networks having similar filter properties.

In the circuit arrangement according to Figure 12 two different electrical networks N, N' are used for separating and recombining the two frequency ranges one of which is to pass amplified and the other unamplified. The two networks may be completely alike each consisting of two component networks or quadripoles $V_1$, $V_2$ and $V_1'$, $V_2'$ designed as filters. One quadripole $V_1$ or $V_1'$, as the case may be, is connected with one pair of terminals $\alpha_1$ or $\alpha_1'$ in one arm $g$ or $g'$ of the network, whereas the other quadripole $V_2$ or $V_2'$ is connected between a symmetry point P of the network $V_1$ or $V_1'$ and the other arm $d$ or $d'$ of the network. The pair of terminals $a$ of the one network N serves as input terminals for the structure, whereas the pair of terminals $b'$ of the other network N' form the output terminals of the structure. The other pair of terminals $b$ of the first network N is connected through an amplifier W with the other pair of terminals $a'$ of the following network N'. The free pair of terminals $\beta_1$ of the quadripole $V_1$ is with its pair of terminals $\beta_1'$ connected with a corresponding quadripole $V_1'$ of the following network, and in like manner the outer terminals $\beta_2$ of the quadripole $V_2$ of the first network are connected with the corresponding terminals $\beta_2'$ of the quadripole $V_2'$ of the other network.

It will be assumed that to the input terminals $a$ of the structure two groups of oscillations $S_1$ and $S_2$ arrived each of said groups belonging to a corresponding one of two different frequency ranges and that the frequencies of the oscillations $S_1$ lie within the frequency range of the two filters of each network N, N' whereas the frequencies of the oscillations $S_2$ lie entirely outside said range of frequencies. The oscillations $S_2$ will therefore flow directly to the output terminals $b$ of the first filter without being distributed on the two filters, pass through the amplifier W to the input terminals $a'$ of the following network and further through this network without being influenced by the filter. The oscillations $S_1$, on the other hand, cause no voltage between the output terminals $b$ but are distributed with equal energy on the two filters, assuming a suitable dimensioning of the latter, so that half of the energy $$\frac{S_1}{2}$$

will pass through the quadripole $V_1$ to the quadripole $V_1'$ and the other half of the energy through the quadripole $V_2$ to $V_2'$. It is assumed further that the energy entering the network N' through the quadripole $V_1'$ produces currents $I_1$ whereas the energy entering through $V_2'$ produces currents $I_2$. As will be clear from Figure 12 said currents neutralize each other in one half of the network N' whereas they aid each other in the other half of the network. Thus the result is that the oscillations $S_1$ entering through $V_1'$ and $V_2'$ are directed in the network and leave the filter in one direction only, in this case in the direction to the right. The same amount of energy $S_1+S_2$ as was introduced at the input terminals $a$ may thus, disregarding unavoidable losses in the filters, be taken out at the output terminals $b'$.

Figure 13:
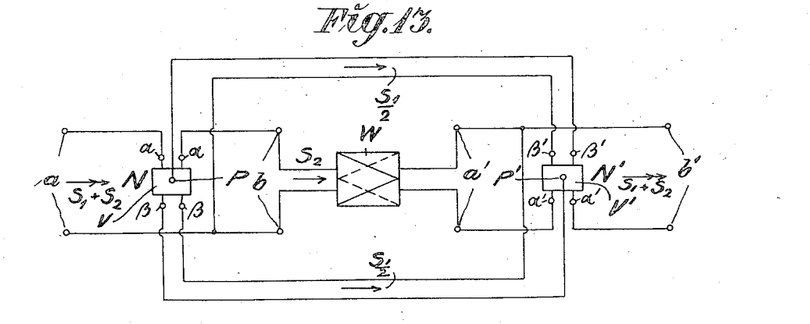

Figure 13 shows diagrammatically a modification of the circuit arrangement according to Figure 12, in which modification two component networks or quadripoles V, V' are common to both networks N and N', each quadripole being connected with one side to one network and with the other side to the other network. Thus one quadripole V is included with one pair of terminals $\alpha$ in one arm of the network N whereas the other pair of terminals $\beta$ is included in the other network N' as cross impedance between one arm of said network and the middle point P' of the quadripole V', which is connected with one pair of terminals $\alpha'$ in the other arm of N'. The other pair of terminals $\beta'$ of V' is connected to the network N in like manner as the terminals $\beta$ to the network N'. The manner of operation will be substantially the same as in Figure 12. Of the oscillations coming in at the input terminals $a$ the oscillations $S_2$ pass directly through the filter V, the amplifier W and the network N' and the oscillations $S_1$ pass with one half of their energy through the pair of terminals $\beta$ and with their other half through the pair of terminals $\beta'$. Thus the oscillations $S_1$ enter the network N' in the same manner as in Figure 12 and are directed to the right wherefore the total energy $S_1+S_2$ can be taken out at the output terminals $b'$.

The circuit arrangement according to Figure 12 may be modified, if desired, also by combining the two quadripoles $V_1$ and $V_1'$ to a single quadripole having two symmetry points P and P', and the two quadripoles $V_2$ and $V_2'$ may be combined in a similar manner. Even in this way a circuit arrangement is obtained in which the two networks N and N' have two filters in common.

Figure 14:
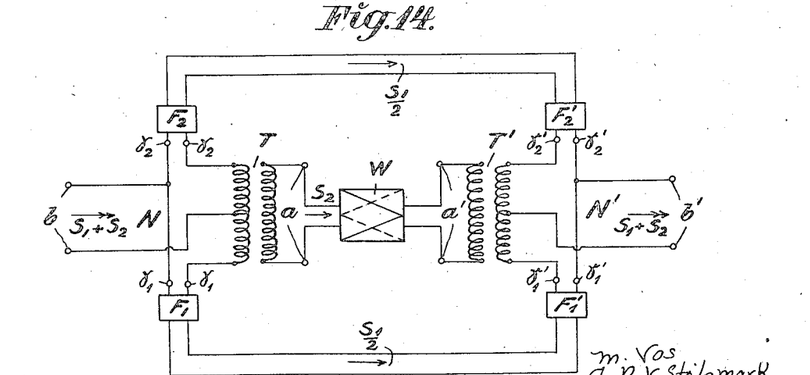

In the circuit arrangement according to Figure 14 there is used for each of the two networks N, N' a bridge connection comprising two filters $F_1$, $F_2$ and $F_1'$, $F_2'$ respectively. In the network N the filters $F_1$ and $F_2$ are included each with one pair of terminals $\gamma_1$ and $\gamma_2$ in two adjacent arms of the bridge, the two other arms thereof being formed by two equal winding halves of a differential transformer T. One pair of main terminals $a$ is located in one diagonal of the bridge whereas the other pair of main terminals $b$ is formed by the terminals of a winding half of the differential transformer. The other network N' is designed in corresponding manner. Between the two differential transformers T and T' is connected an amplifier W. The two filters $F_1$, $F_2$ of the network N are connected with their free pairs of terminals to the corresponding pairs of terminals of the other network N'. In each network the two filters are reciprocal in such a manner that the product of their characteristic impedances at the pairs of terminals included in the bridge is constant, i. e. independent of the frequency. For frequencies within the common frequency range of the filters the bridge is balanced. For frequencies outside said frequency range, on the other hand, the characteristic impedance of one filter is almost zero and the characteristic impedance of the other filter very great. Of the oscillations $S_1 + S_2$ arriving at the input terminals $a$ the oscillations $S_2$ will therefore pass freely through the differential transformer and further through the amplifier W to the opposite network through which they also pass freely. The oscillations $S_1$, on the other hand, for which the bridge is balanced are equally distributed on the two filters $F_1'$ and $F_2'$ and enter the network N' through the filters $F_1'$ and $F_2'$. In the network N' said oscillations become directed in exactly the same manner as in the structures already described, the total energy $S_1 + S_2$ thus leaving through the output terminals $a'$.

Figure 18:
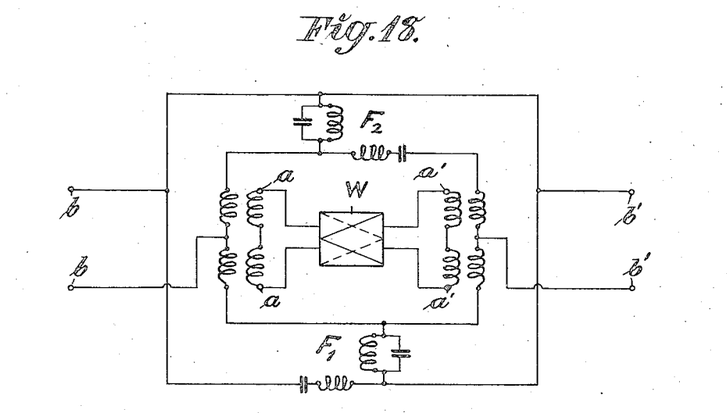

As is evident from Figure 14, the filters $F_2$, $F_2'$ may be combined to form a single filter as may also the filters $F_1$, $F_1'$ so that the two networks will contain two filters in common. Such an embodiment is shown in Figure 18.

Figure 15:
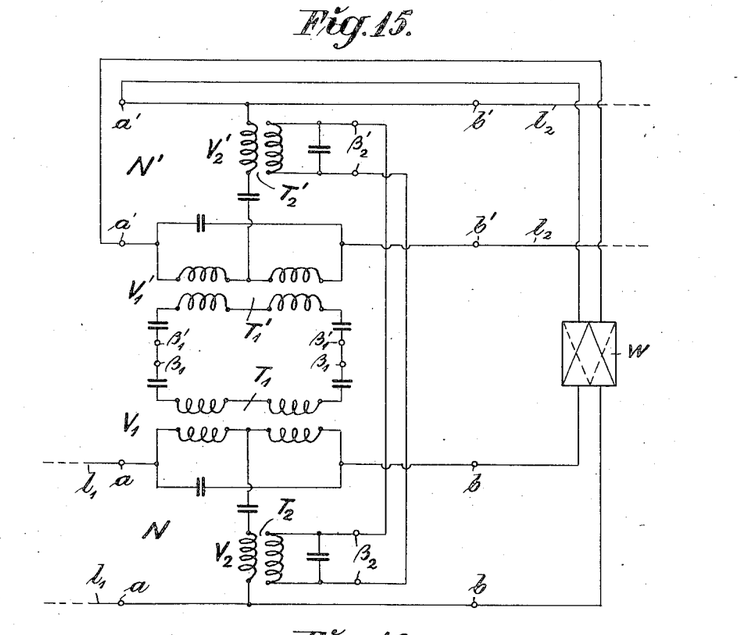

The network according to Figure 15, which network is provided with terminal pairs $a$, $b$, $a'$ and $b'$, is formed by combining two networks N and N'. The network N consists of two filters $V_1$, $V_2$ and the network N' of two similar filters $V_1'$, $V_2'$. In the shown embodiment each filter is of the type in which each half link consists of a transformer $T_1$, $T_2$, $T_1'$ or $T_2'$ respectively to one side of which condensers are connected in series with the branches (in an unsymmetrical construction only one condenser in one branch) and to the other side of which is connected a cross condenser. The filters $V_2$ and $V_2'$ respectively are connected in shunt and the filters $V_1$ and $V_1'$ are connected in series in both networks. The filters $V_2$ and $V_2'$ respectively are provided with outer terminals $\beta_2$ and $\beta_2'$ respectively and the filters $V_1$ and $V_1'$ respectively with outer terminals $\beta_1$ and $\beta_1'$ respectively. The interconnection of the two networks is effected by connecting together the outer terminals $\beta_1$ and $\beta_2$ respectively of the filters $V_1$, $V_2$ with the corresponding outer terminals $\beta_1'$ and $\beta_2'$ respectively of the filters $V_1'$, $V_2'$, each of the filter groups $V_1$, $V_1'$ and $V_2$, $V_2'$ then operating as a single filter consisting of a complete link. The filters $V_1$, $V_2$, $V_1'$, $V_2'$ included in the composite network are all dimensioned for the same transmitting or passing range. When oscillation energy within a wide frequency range is supplied to the input terminals $a$ of the network N the frequency band passed freely by the filter is transmitted to the other network with equal distribution on the two pairs of terminals $\beta_1'$ and $\beta_2'$, whereas frequencies outside said frequency range are conducted to the output terminals $b$ of the network N. It is assumed that the transformers $T_1$ and $T_2$ are wound in such a manner, that oscillations supplied to the network N' with equal energy from two sides will counteract or neutralize each other in respect of the terminals $a'$ so that the voltage between said terminals becomes zero, whereas the same oscillations will assist each other in regard to the terminals $b'$. As the oscillations are transmitted quite symmetrically from one network to the other with regard to the input terminals $a$ and the output terminals $b$ of the network N, the impedance between the terminals of said two terminal pairs will be constant for all frequencies. In order to render possible interconnection of the different filters without loss of energy, the ratios of transmission of the transformers $T_1$, $T_2.T_1'$, $T_2'$ (reckoned in the direction towards the output terminals of the filters) must be selected so that $$\frac{\mu_1}{\mu_1'} = \frac{\mu_2}{\mu_2'}$$

where $\mu_1$, $\mu_1'$, $\mu_2$ and $\mu_2'$ designate the ratio of transmission of the transformers $T_1$, $T_2$, $T_1'$ and $T_2'$ respectively. In order that the impedance between the terminals $a$ and $b$ shall be equal to $k$ and the impedance between the terminals $b'$ equal to $k'$, and that $k$ and $k'$ shall be constant at all frequencies the following conditions must be fulfilled:

$$Z_1 = 2k \qquad Z_1' = 2k'$$
$$Z_2 = \frac{k}{2} \qquad Z_2' = \frac{k'}{2}$$

where $Z_1$, $Z_1'$, $Z_2$ and $Z_2'$ respectively designate the impedances at the inner terminals of the filters $V_1$, $V_1'$, $V_2$ and $V_2'$ respectively at the middle of the frequency band. An impedance structure of this kind thus operates as an ordinary band filter both between its terminals $a$ and $b'$ and between its terminals $a'$ and $b$. Between the terminals $a$ and $b$, $a$ and $a'$, $b$ and $b'$, on the other hand, the network operates as a so-called band blocking filter for the frequency band of the filters.

According to the invention an amplifier is included in this network in such a manner that either the frequency band for which the network is dimensioned is amplified and the remaining frequencies allowed to pass unamplified, or the frequency band is allowed to pass without amplification while the other frequencies are amplified. Figure 15 illustrates the latter case. Between the pairs of terminals $b$ and $a'$ is connected an amplifier W. To the pairs of terminals $a$ and $b'$ are connected lines $l_1$ and $l_2$ respectively which lines also may symbolize other apparatus. Of the frequencies entering at the terminals $a$ the frequency band of the network will pass on directly to the output terminals $b'$ and the line $l_2$. Said frequencies are thus not amplified. All frequencies outside said band, on the other hand, will pass via the pair of terminals $b$ through the amplifier W to the pair of terminals $a'$. Frequencies outside the frequency band of the filter supplied to said pair of terminals will pass through the network N' to the pair of terminals $b'$ and continue onto the line $l_2$ In case amplification is desired for the frequency band but not for the frequencies lying outside said band line $l_2$ is connected to the pair of terminals $b$ and the amplifier W included between the pairs of terminals $b'$ and $a'$. The frequency band flowing from $a$ to $b'$ and from $a'$ to $b$ respectively inside the network will be amplified in the amplifier W connected outside the network between the pairs of terminals $b'$ and $a'$.

The amplifier W may be single or double directional. In the latter case it may preferably be designed as an ordinary two-way amplifier for two-wire lines.

Figure 16:
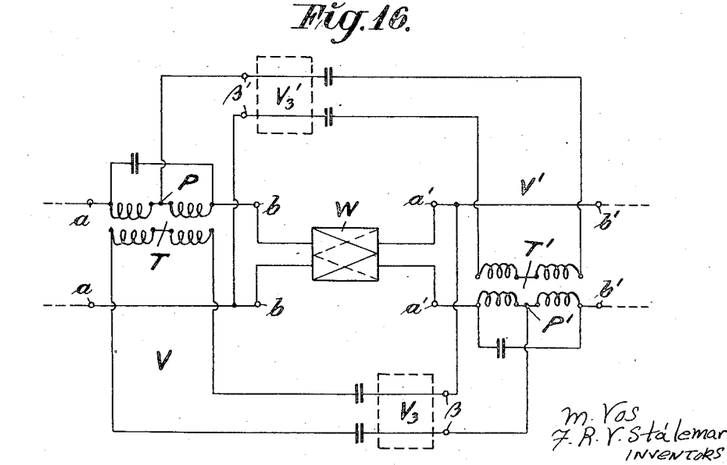

In Figure 16 is shown an embodiment of the arrangement according to Figure 13. The two filters V and V' are designed substantially in the same manner as in Figure 15. Yet in this case each filter consists of half a section only and not as in Figure 15 (considering each of the groups $V_1$, $V_1'$ and $V_2$, $V_2'$ as one filter) of a complete filter section. Each filter consists of a transformer T or T' respectively the ratios of transmission of which $\mu$ and $\mu'$ respectively (reckoned in the direction from the windings included in the line branches) have the mutual relation.

$$\mu = \frac{\mu'}{4}$$

If a voltage $v$ having a frequency within the frequency band of the filter is impressed upon the input terminals $a$ of the network the voltage $\mu$—$v$ will be set up between the terminals $\beta$ and the voltage $$\frac{\mu' v}{4}$$

between the upper terminal $a'$ and the point P'. Provided the circuit is built up in such a manner that said two voltages counteract each other the voltage at $a'$ will be equal to $$\mu.v - \frac{\mu' v}{4}$$

As $$\mu = \frac{\mu'}{4}$$

said voltage will be zero at $a'$ and will be equal to $$\mu.v + \frac{\mu'.v}{4} = \frac{\mu'.v}{2} \text{ at } b'$$

The network thus operates as an ordinary band filter both between the pairs of terminals $a$ and $b'$ and between the pairs of terminals $b$ and $a'$. Between the pairs of terminals $a$ and $b$ as well as between $a'$ and $b'$ all frequencies within the frequency band of the filters are suppressed (band suppression effect). Between the pairs of terminals $a$ and $a'$ as well as between $b$ and $b'$ the attenuation will be very great (theoretically infinitely great) for all frequencies within as well as outside the band. If the network, as was the case in the preceding example, is dimensioned in such a manner that the impedance between its input and output terminals $a$ and $b$ is equal to $k$ the impedance between the terminals $a'$ and $b'$ will be equal to $$\frac{\mu'^2 .k}{4}$$

The quantity $k$ is constant for all frequencies.

If thus an amplifier W, as in Figure 15, is connected between the pairs of terminals $b$ and $a'$, all frequencies outside the frequency band of the filters will pass through the amplifier and all other frequencies pass by the amplifier through the filters. In the description of the network it has been assumed for the sake of simplicity that the filter attenuation inside the band is zero and outside the band infinitely high. In practice this is of course not possible to obtain. In the described circuit arrangements a certain amount of energy will always be brought from the output side of the amplifier back to its input side. In dimensioning the arrangements consideration must therefore always be given to the fact that the amplification of the amplifier W will lie a certain safety distance, f. i. 1 Neper, below the attenuation of the filter for frequencies outside of the band. The higher the desired amplification the greater is the requisite number of filter sections. For this reason, if a very high amplification is desired in the arrangement according to Figure 15 a certain number of complete filter sections must be connected between the terminal pairs $\beta_1$ and $\beta_1'$ and the same number of links between $\beta_2$ and $\beta_2'$. Such incorporation of additional filters in the arrangement according to Figure 16 is illustrated through the filters $V_3$ and $V_3'$ shown in dot and dash lines. In the network according to Figure 15 ($V_1$, $V_1'$ and $V_2$, $V_2'$) each filter chain is formed by an even number of half sections and in the network according to Figure 16 ($V_1$, $V_3$ and $V_1'$, $V_3'$) of an uneven number of half sections. For example, if it is desired to include an amplifier having an amplification of 2, 2 Neper for the voice frequency range up to about 2500 Hertz and to pass a high frequency band between 4750 and 12750 Hertz without amplification, the provision of two half filter sections $V_1$, $V_1'$ and $V_2$, $V_2'$ respectively for each filter chain as shown in Figure 15 has been found to be sufficient.

Figure 17:
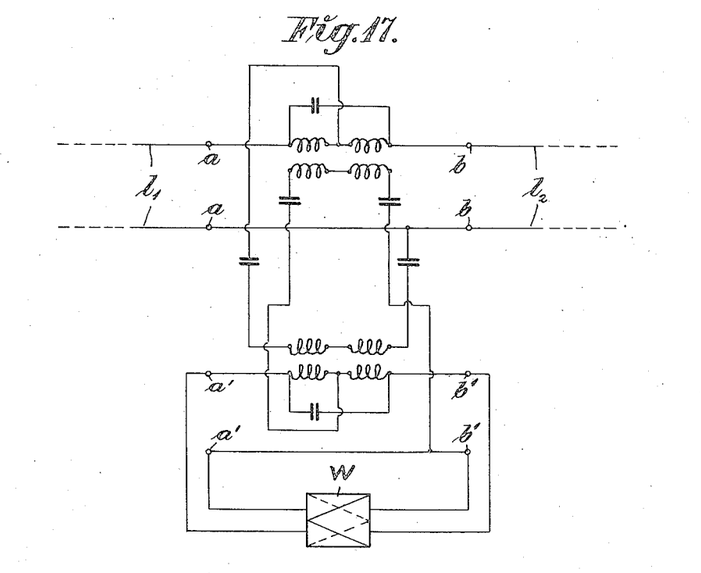

In Figure 17 is shown a circuit arrangement in which the network is designed in similar manner as in Figure 15. All frequencies outside the band flow from the line $l_1$ directly to the line $l_2$ without being amplified, whereas the frequency band flows through the filter to the pair of terminals $b'$ and further through the amplifier included outside the network between $b'$ and $a'$ in order finally to pass through the filters to the pair of terminals $b$ and the line $l_2$. The amplifier W may as in the preceding case be double directional, for example in the manner of an ordinary two-way amplifier.

In Figure 18 is shown a practical embodiment of the diagrammatical arrangement in Figure 14. The filters $F_1$, $F_1'$ and $F_2$, $F_2'$ respectively are combined two and two to form single filters $F_1$ and $F_2$ respectively. The filters are designed in known manner as band filters with one parallel circuit in cross connection and a series circuit in series connection. The manner of operation is exactly the same as in the arrangement according to Figure 14.

As the characteristic impedance at all pairs of input and output terminals $a$, $b$, $a'$ and $b'$ is constant for all frequencies it is possible simply to connect the amplifier directly with correct adaptation. It is also possible to connect several such amplifier structures, which are dimensioned for different frequencies, in cascade without the different networks influencing each other.

In certain of the embodiments according to Figures 12 to 18 two filters or filter chains are included with their input terminals in arms or diagonals of a first bridge and with their output terminals in arms or diagonals of a second bridge so that a double network having four pairs of main terminals is formed. The four pairs of main terminals have when combined two and two in different ways a different selective effect in relation to each other. Oscillations supplied to one pair of main terminals in one bridge are taken out with substantially their whole energy either at the other pair of terminals of the same bridge or at one of the two pairs of main terminals of the other bridge, according as their frequency lies outside or within the common frequency range of the two filters. The two pairs of terminals are then mutually blocked in the first case for the frequencies coming within the frequency range and in the second case for the frequencies lying outside the frequency range. Furthermore, in certain combinations of two the pairs of main terminals of the double network are mutually blocked for all frequencies.

In a further development of said arrangement the double network is connected in a special way to a two-wire connection as shown in Figures 19 to 26 inclusive, viz. in such a manner that two pairs of main terminals of the same, which are mutually blocked for frequencies within the common frequency range of the two filters of the double network, are included in the two-wire connection whereas an amplifier is connected between two pairs of main terminals of the double network, which are mutually blocked for all frequencies. In said arrangement of the double network all frequencies within the common frequency range of the filters will pass through the amplifier and continue further in amplified condition out on the line, whereas all other frequencies pass the double network without being amplified. A circulation of currents in the amplifier is hereby effectively prevented.

The arrangement according to the invention may be used particularly for the purpose of employing a single amplifier for amplifying two separate frequency bands representing different audio channels with opposite talking directions. In this case two double networks according to the invention, each dimensioned for a corresponding one of the two frequency bands are connected in the line in cascade, each double network being connected in with the pairs of main terminals appertaining to a bridge of the same whereas the amplifier is connected between pairs of main terminals of the two double networks which are not connected in the line. Through a suitable selection of the two last mentioned pairs of main terminals a circulation of current within the amplifier is effectively prevented.

Figure 19:
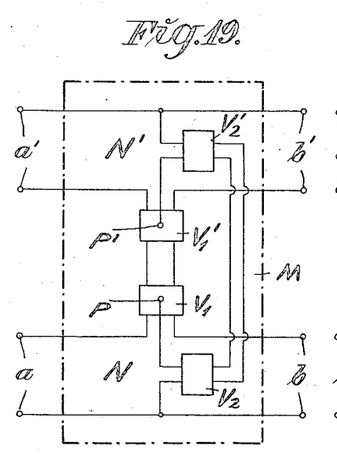
Figure 20:
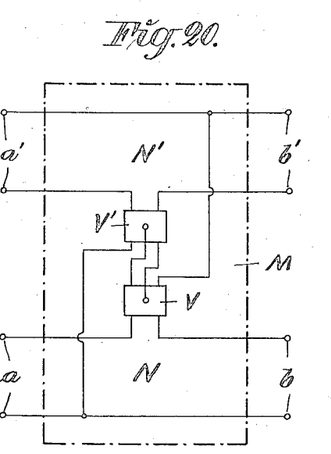

Figures 19 and 20 represent simplified diagrams of the double networks shown in Figures 12 and 13. In the embodiment according to Figure 19 each network N and N' respectively is composed of two quadripoles $V_1$, $V_2$ and $V_1'$, $V_2'$ respectively. In the embodiment according to Figure 20 the two quadripoles are combined in pairs so that only two quadripoles V, V' are included in the double network. The embodiment according to Figure 21 of a double network adapted to be used in connection with the invention consists of two single networks N, N' each of which is designed and dimensioned in approximately the same manner as described in connection with Figure 14. Each single network of this type contains a differential transformer T and T' respectively. The two single networks N and N' each contains a filter F and F' respectively.

Figure 21:
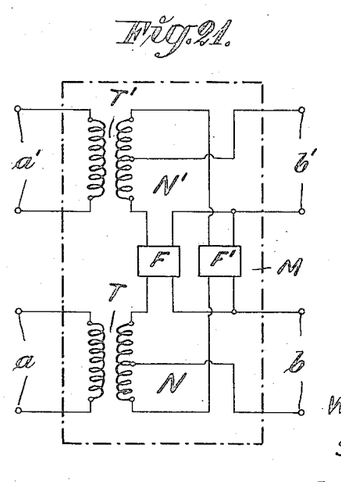

A double network according to Figures 19, 20 or 21 has four pairs of terminals which in the drawings are designated $a$, $b$, $a'$ and $b'$. If such a double network is terminated with correct adaptation at its four pairs of terminals the impedance at all pairs of terminals will be substantially constant. If the two single networks contained in such a double network are dimensioned for passing the same frequency range, the double network operates between the pairs of terminals $a$ and $b$ and between $a'$ and $b'$ as a band suppression filter, and between the pairs of terminals $a$ and $b'$ and between $b$ and $a'$ as an ordinary band filter. The band suppression effect as well as the ordinary filter effect refers to the frequency band for which the two component networks N and N' are dimensioned. Between the pairs of terminals $a$ and $a'$ and between $b$ and $b'$ the double network blocks all frequencies. Thus frequencies outside the band arriving at the pair of terminals $a$ pass directly to the pair of terminals $b$. Frequencies within the band received at the pair of terminals $a$ pass through the component networks N and N' to the pair of terminals $b'$. The fact, that frequencies outside the frequency band of the network do not flow from one component network to the other is due to pure filter action, whereas the property of each component filter of directing frequencies within the band towards a certain pair of terminals depends upon a differential action. This differential action has been more closely explained in connection with Figure 16.

Figure 22:
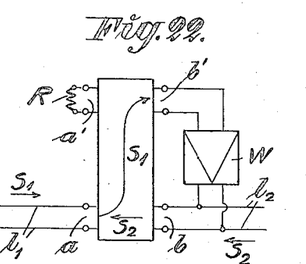
Figure 23:
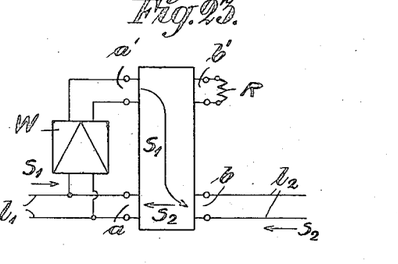

In Figures 22 and 23 are shown two arrangements for amplifying a certain frequency range $S_1$ while all other frequencies are allowed to pass without amplification in both directions. The arrangements are included between two line sections $l_1$, $l_2$ of a line over which, in addition to the frequency range $S_1$ to be amplified, also other frequencies are transmitted. As an example of a part of said other frequencies it will be assumed that a frequency range $S_2$ is to be transmitted over the line in a direction opposite to the direction of transmission of the frequency range $S_1$. The two arrangements are composed of a double network according to Figures 19, 20 or 21 and an amplifier W.

In Figure 22 the doublet network is connected in the line between $l_1$ and $l_2$ by means of its pairs of terminals $a$, $b$ between which a band suppressing effect is obtained, and the amplifier is connected with its input side to the pair of terminals $b'$ and with its output side to the pair of terminals $b$, i. e. between two pairs of terminals between which the double network blocks all frequencies. The frequency range $S_1$ coming from the line section $l_1$ and supplied to the pair of terminals $a$ is on account of differential action inside the double network directed to the pair of terminals $b'$. From here the frequency band flows through the amplifier W to the line section $l_2$ connected to the pair of terminals $b$. At these points the energy is divided in two equal parts, one half returning to the double network through the pair of terminals $b$ and to an end resistance R connected to one pair of terminals $a'$ and having the same magnitude as the line impedance, and the other half passing out on the line section $l_2$.

In Figure 23 the amplifier is connected with its input side to one line section $l_1$ and with its output side to the pair of terminals $a'$. As $l_1$ is connected to the pair of terminals $a$ the amplifier will also in this case be included between two pairs of terminals of the double network between which all frequencies are blocked. In this embodiment the frequency range $S_1$ coming in from $l_1$ flows first through the amplifier W and thereafter through the double network from the pair of terminals $a'$ to the pair of terminals $b$ and to the line section $l_2$. In this case the energy is divided before the amplifier W so that one half flows through the amplifier and the other half through the double network to a resistance R connected to the pair of terminals $b'$. The fact, that in this case the energy is dissipated before the amplifier and not, as in the arrangement according to Figure 22, after the amplifier may be advantageous in certain respects as the quantitative loss of energy is hereby made smaller. By including a band suppression filter with suppression effect for the frequency range to be amplified it is, however, possible to avoid the loss of energy. If in the arrangement according to Figure 22 such a filter adapted to block only $S_1$ is connected between the output side of the amplifier and the pair of terminals $b$ the frequency band $S_1$ can flow only to the line section $l_2$. In Figure 23 a corresponding band suppressing filter may be included between the input side of the amplifier W and the pair of terminals $a$.

The risk for singing to occur in the two described arrangements is not great as the frequency band $S_1$ to be amplified is directed through the double network on account of differential action. This action may in such a double network be made very pronounced through comparatively simple means. Through the provision of an additional band suppression filter the risk of singing will be further reduced.

Figure 24:
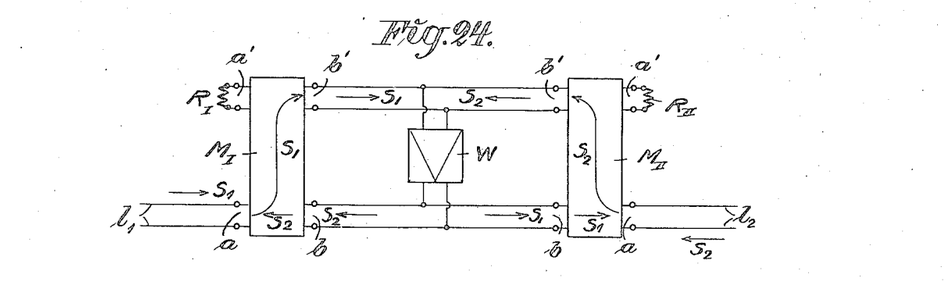
Figure 25:
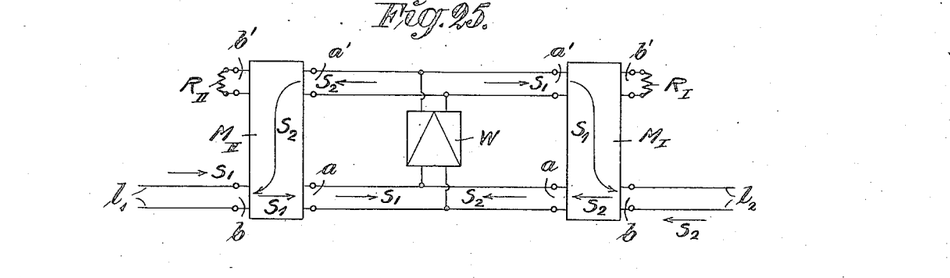

In Figures 24 and 25 arrangements are shown which in addition to a single amplification of a certain frequency range, in this case represented through a double directional connection with different frequency ranges for each direction, also renders possible a simultaneous use of a single amplifier for the two directions of transmission in the double directional connection. The arrangement in Figure 24 consists of two double networks $M_I$ and $M_{II}$ which are dimensioned for a frequency range $S_1$ and $S_2$ respectively. The two double networks are connected together at such pairs of terminals of each network between which all frequencies are blocked. This is obtained in the shown embodiment through the connection of the pairs of terminals $b$ and $b'$ in one double network with the corresponding pairs of terminals in the other network. The amplifier W is connected in such a manner between the junction lines of the two double networks, that its input side is connected to the pairs of terminals $b'$ and its output side to the pairs of terminals $b$. One line section $l_1$ is connected to the pair of terminals $a$ of the double network $M_I$ and the other line section $l_2$ is connected to the corresponding pair of terminals of the double network $M_{II}$.

All frequencies which lie outside the frequency range of the double network $M_I$ as well as outside that of the double network $M_{II}$ and, for example, arrive from $l_1$ at the pair of terminals $a$ of $M_I$ flow without substantial attenuation through the pair of terminals $b$ of said network and the pairs of terminals $a$ and $b$ of the double network $M_{II}$ to the line section $l_2$. Corresponding conditions prevail for currents of said frequencies coming from the line section $l_2$. Currents $S_1$ of frequencies within the range of the double network $M_I$, which are coming in from $l_1$, flow through the two component networks to the pair of terminals $b'$. Here a division of the energy takes place, one part flowing to the pair of terminals $b'$ of the double network $M_{II}$ and the other part through the amplifier W. The part arriving at the pair of terminals $b'$ is dissipated in a resistance $R_{II}$ connected to the pair of terminals $a'$, for the reason that the currents $S_1$ do not come within the frequency range of the double network $M_{II}$. The energy which has been amplified in W divides itself again and flows to the two pairs of terminals $b$ of $M_I$ and $M_{II}$. The part flowing to $M_I$ is dissipated in a resistance $R_I$ connected to the pair of terminals $a'$. The part flowing to $M_{II}$ flows directly through the pair of terminals $a$ out on $l_2$. In similar manner a signal $S_2$ coming in from $l_2$ and comprising frequencies only within the frequency range of the double network $M_{II}$ will flow through said network via the pair of terminals $b'$ through the amplifier W and through the pair of terminals $b$ of $M_I$ to the pair of terminals $a$ and out on $l_1$. Part of the energy, it is true, is lost in the resistance R, but this inconvenience is of minor importance in comparison with the advantages gained by that the same amplifier W can be used for both talking directions.

The arrangement shown in Figure 25 is designed in the same manner as the arrangement shown in Figure 24 except that the amplifier W is connected with its input side to the pairs of terminals $b$ and with its output side to the pairs of terminals $b'$. The manner of operation is the same in principle as in Figure 24, and as in both of said embodiments the energy is divided before as well as after the amplifier the two arrangements are theoretically equivalent in this as well as in other respects. As in the arrangements according to Figures 22 and 23 it is possible also in the embodiments according to Figures 24 and 25 to use special band suppression filters for the purpose of avoiding considerable losses of energy. In Figure 24, for example, it is possible to connect between the output side of the amplifier W and the pair of terminals $b$ of the network $M_I$ a band suppression filter having a blocking action only for $S_1$, and between the output side of the amplifier W and the pair of terminals $b$ of $M_{II}$ a similar band suppression filter having a blocking action only for $S_2$. In the arrangement according to Figure 25 band suppression filters may be included in similar manner for the purpose of blocking the frequencies $S_1$ between W and the pair of terminals $b'$ of $M_{II}$, and band suppression filters adapted to block $S_2$ may be connected between W and the pair of terminals $b'$ of $M_I$.

As was the case in the arrangements according to Figures 22 and 23 there is also in the arrangements shown in Figures 24 and 25 no great risk for singing to occur, the path for the back-coupling of certain frequencies being blocked through differential action in the double networks and in certain cases also through special band suppression filters.

Figure 26:
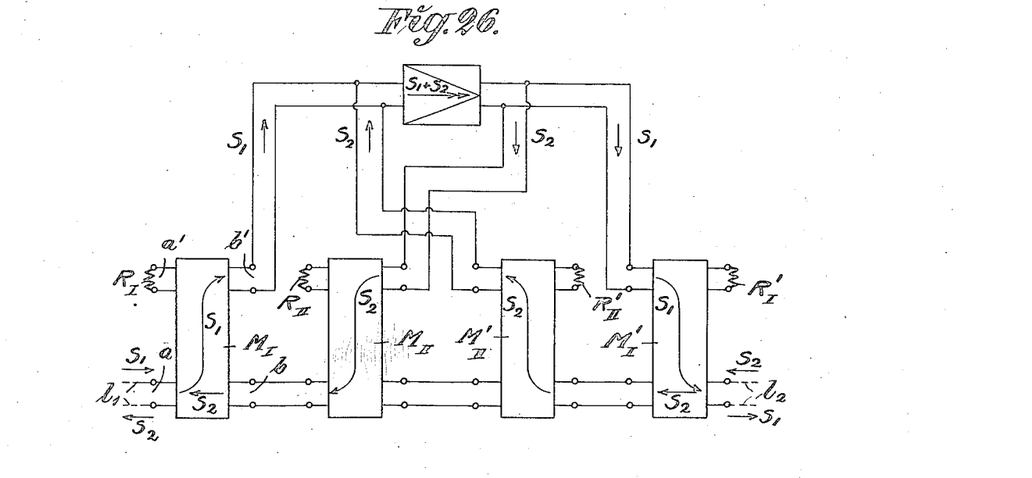

In Figure 26 is shown a further example of part amplification of a frequency range consisting of a frequency band for each direction of transmission. The arrangement comprises an amplifier W and four double networks $M_I$, $M_{II}$, $M_I'$ and $M_{II}'$ according to Figures 19, 20 and 21, of which double networks $M_I$ and $M_I'$ are dimensioned for free passage of the frequency range $S_1$ coming in from $l_1$ and $M_{II}$ and $M_{II}'$ are dimensioned for free passage of the frequency range $S_2$ coming in from $l_2$. The networks are usually connected with each other and with the line sections $l_1$ and $l_2$ through the pairs of terminals $a$ and $b$ so that a direct path is formed from $l_1$ to $l_2$ or vice versa for all frequencies outside the frequency range of the double network. The amplifier W is connected with its input side to the pair of terimals $b'$ of the network $M_I$ and also to the corresponding pair of terminals of the network $M_{II}'$. The output side of the amplifier is connected in corresponding manner to the terminals $b'$ of the networks $M_{II}$ and $M_I'$. To the pairs of terminals $a'$ of all the networks are connected resistances R. The signal $S_1$ coming in from $l_1$ passes across the network $M_I$ between the two pairs of terminals $a, b'$, through the amplifier W and through the pairs of terminals $b', a$ of the network $M_{I}'$ out on $l_2$. Loss of energy occurs before as well as after the amplifier. Before the amplifier one half of the incoming energy is diverted via the pair of terminals $b'$ of the network $M_{II}'$ to the resistance $R_{II}'$ connected to the pair of terminals $a'$, and after the amplifier one half of the amplified energy is diverted via the pair of terminals $b'$ of the network $M_{II}$ to the resistance $R_{II}$ connected to the pair of terminals $a'$. The signal $S_2$ coming in from $l_2$ flows through the pairs of terminals $a, b$ of the network $M_{I}'$, through the network $M_{II}'$ between the pairs of terminals $a$ and $b'$, through the amplifier W, through the network $M_{II}$ between the pairs of terminals $b'$ and $a$, and through the network $M_I$ between the pairs of termnials $b$ and $a$ to $l_1$. For said range of frequencies the same energy losses occur as for $S_1$.

An arrangement according to Figure 26 is more expensive than the arrangements shown in Figures 24 and 25, it is true, the number of networks being twice as great, but the risk for singing to occur is still less in this arrangement than in the arrangements according to Figures 24 and 25, as the back-coupling is neither being damped through differential and filter action nor through double differential action. Also in this arrangement loss of energy may be avoided by including band suppression filters between the double networks and the amplifier.

We claim:

1. An electrical network forming a bridge connection and comprising in combination two pairs of separate terminals of the network each included in one diagonal of the bridge, two filters composed of shunt impedances and series impedances and having the same transmission range each of said filters being connected with one pair of terminals into two adjacent arms of the bridge, impedances connected to the opposite pairs of terminals of the filters, said impedances being adapted to take up oscillatory energy within the transmission range of the filters, said filters being so dimensioned that the product of the impedances at the pairs of terminals of the filters connected into the bridge is substantially constant for all frequencies, and that the bridge is balanced for frequencies within the transmission range of the filters and unbalanced for frequencies outside said transmission range.

2. Electrical network as claimed in claim 1, characterized in that the filters are composed of an equal number of reciprocal impedance elements, i. e. a certain impedance element in one filter corresponds to a certain impedance element in the other filter, the geometrical mean of the impedances of the corresponding impedance elements being substantially constant.

3. Electrical network as claimed in claim 1, characterized in that those terminal pairs of the filters which are not included in the bridge are connected together in parallel and that an end impedance common to the two filters is connected to said parallel connected pairs of terminals.

4. Electrical network as claimed in claim 1, characterized in that the terminal pairs of the filters not included in the bridge are connected together in series and that an end impedance common to the two filters is connected to said series connected terminal pairs.

5. Electrical network as claimed in claim 1, characterized in that the pairs of terminals of the filters not included in the bridge are connected together by means of an inductive coupling and that the means for tapping off oscillatory energy from the filters is connected to said pairs of terminals by means of said inductive coupling.

6. An arrangement composed of a number of networks according to claim 1, which networks are mutually connected in series (connected in cascade) by means of their pairs of terminals lying in the diagonals, the pairs of filters included in the different series connected networks being dimensioned to let through different ranges of frequencies.

7. A double network composed of two equal networks according to claim 1 in which those pairs of terminals of the two filters of one network which are not included in arms or diagonals thereof are connected in pairs with the corresponding pairs of terminals of the other network.

8. An arrangement composed of a number of single bridge networks according to claim 1 which bridges are pairwise connected together to double networks in such a manner that the two filters included each with one pair of terminals in a diagonal of the one bridge are included with their opposite terminals in diagonals of the other bridge, the input and output terminals of one bridge of each double network forming the input and output terminals of this double network, and the different double networks being connected in cascade by means of said input and output terminals, the filters included in the various double networks having different transmission ranges.

9. An arrangement composed of a number of single bridge networks according to claim 1, each bridge having a differential transformer associated with one of its diagonals, said bridges being in pairs connected together by means of their said differential transformers in such a manner that the differential transformers which are connected with each other and have the same ratio of transmission are combined two and two to form choke coils provided with a middle tapping.

10. In a two-wire connection containing one or more audio channels, an arrangement for amplifying the oscillations of one audio channel independently of the other oscillations of the connection, which arrangement comprises an electrical network provided with more than two pairs of terminals and having different filter actions between different pairs of terminals, said network comprising two filters having the same frequency range and the characteristic impedances of which are dependent of the frequency in opposite manner at their input and output sides, the filters being included with said input or output sides in the arms or diagonals of a bridge, which in two of the other diagonals or arms contains two pairs of main terminals of the network not included in the filter, an amplifier for the oscillations to be amplified being connected on each side of said network, the line being then connected to one pair of main terminals and a corresponding impedance, for instance an amplifier, being connected to the other pair of main terminals.

11. An arrangement according to claim 10, characterized in that the two filters of each network are included in two diagonals of the bridge and contain a common filter element forming on the one hand two series connected halves of a cross impedance of one filter and on the other hand two equal parallel connected branches of a series impedance of the other filter, and that the two pairs of main terminals not appertaining to the filter form two adjacent arms of the bridge.

12. An arrangement according to claim 10, characterized in that the two filters are included in two adjacent arms of the bridge and that the pairs of main terminals each form a diagonal or one of two opposite sides of the bridge.

13. An arrangement according to claim 10, characterized in that the double network (M) is included in the two-wire connection with two pairs of main terminals $(a, b)$ which are mutually blocked for frequencies within the common range of frequencies of the two filters of the double network (M), and that the amplifier is connected between two pairs of main terminals $(a, a'$, or $b, b'$ respectively) of the double network (M) which are mutually blocked for all frequencies.

14. An electrical network comprising in combination a first bridge, two pairs of separate terminals each included in one arm of said bridge, a second bridge, two pairs of separate terminals each included in one arm of said second bridge, said bridges being connected together to a double network by means of two filters included with their input terminals in arms of the first bridge and with their output terminals in arms of the second bridge, said filters being so dimensioned that the product of the impedances at the two pairs of input terminals of the filters as well as the product of the impedances at the two pairs of output terminals is substantially constant for all frequencies, an amplifier connected between two pairs of separate terminals of the double network, the double networks being connected into a two-wire connection by means of two pairs of separate terminals.

15. An arrangement as claimed in claim 14, characterized in that the input side of the amplifier is connected to one of the two pairs of terminals not included in the two-wire connection, and that the double network is terminated reflectionless at the four pairs of terminals by means of an end impedance.

16. An arrangement as claimed in claim 14, characterized in that the output side of the amplifier is connected to one of the two pairs of terminals not included in the two-wire connection and that the double network is terminated reflectionless at the four pairs of terminals $(b')$ through an end impedance.

17. An arrangement as claimed in claim 14, characterized in that two double networks ($M_I$, $M_{II}$), which are dimensioned for different ranges of frequencies, are connected in cascade in the two-wire connection and that the amplifier (W) is included in such a manner between two terminals of each double network which are mutually blocked for all frequencies that it amplifies both ranges of frequencies at different talking directions.

18. An arrangement as claimed in claim 14, characterized in that two double networks ($M_I$, $M_{II}$) dimensioned for the same range of frequencies are connected in cascade in the two-wire connection and that the amplifier (W) is connected with its input side to a pair of main terminals of the first double network not included in the two-wire connection and with its output side to a corresponding pair of main terminals of the second double network.

MAURITZ VOS.
FRITZ RAGNAR VALDEMAR STÅLEMARK.